（12） United States Patent
Marvit et al.

(10) Patent No.: US 9,300,869 B2
(45) Date of Patent: Mar. 29, 2016

(54) REDUCTION OF SPATIAL RESOLUTION FOR TEMPORAL RESOLUTION (71) Applicant: FUJITSU LIMITED, Kawasaki-shi, Kanagawa (JP)

(72) Inventors: David L. Marvit, San Francisco, CA (US); Ajay Chander, San Francisco, CA (US); Jawahar Jain, Los Altos, CA (US); Stergios Stergiou, East Palo Alto, CA (US)

(73) Assignee: FUJITSU LIMITED, Kawasaki (JP)

( * ) Notice: Subject to any disclaimer, the term of this patent is extended or adjusted under 35 U.S.C. 154(b) by 138 days.

(21) Appl. No.: 14/062,701

(22) Filed: Oct. 24, 2013

(65) Prior Publication Data

US 2015/0116568 A1    Apr. 30, 2015

(51) Int. Cl.
*H04N 5/225* (2006.01)
*H04N 5/232* (2006.01)

(52) U.S. Cl.
CPC ....... *H04N 5/23245* (2013.01); *H04N 5/23232* (2013.01)

(58) Field of Classification Search
CPC ... H04N 5/23245; H04N 5/343; A61B 5/024; A61B 5/02405
See application file for complete search history.

(56) References Cited

U.S. PATENT DOCUMENTS

| 2004/0080626 | A1* | 4/2004 | Fukuzawa | 348/220.1 |
| 2005/0219642 | A1* | 10/2005 | Yachida et al. | 358/448 |
| 2008/0218616 | A1* | 9/2008 | Wenger | 348/294 |
| 2008/0297613 | A1* | 12/2008 | Takahashi et al. | 348/221.1 |
| 2009/0002504 | A1* | 1/2009 | Yano et al. | 348/218.1 |
| 2009/0167909 | A1* | 7/2009 | Imagawa et al. | 348/262 |
| 2009/0290035 | A1* | 11/2009 | Hosoda | 348/220.1 |
| 2010/0060752 | A1* | 3/2010 | Tokuyama | 348/240.3 |
| 2010/0141783 | A1* | 6/2010 | Sakaguchi et al. | 348/222.1 |
| 2011/0251493 | A1* | 10/2011 | Poh et al. | 600/477 |
| 2012/0095356 | A1* | 4/2012 | Oleson et al. | 600/508 |
| 2013/0345568 | A1* | 12/2013 | Mestha et al. | 600/473 |

OTHER PUBLICATIONS

Keferl, Michael. "New Health phones from Fujitsu and NTT DoCoMo." Shift East. Digital Life, Jul. 31, 2008.
"Your heart rate monitor reinvented." retrieved Oct. 22, 2013. <http://www.cardiio.com/>.
Colombo, R, A Di Cesare, R Maestri, G Minuco, and GD Pinna. "The accuracy of power-spectrum analysis of heart-rate variability from annotated RR lists generated by Holter systems.." Physiol. Meas. May 1994; 15(2): 163-179.
"Heart Rate Variability Standards of Measurement, Physiological Interpretation, and Clinical Use." Circulation. (1996): n. page. Web. Oct. 22, 2013.

(Continued)

*Primary Examiner* — Twyler Haskins
*Assistant Examiner* — Dwight C Tejano
(74) *Attorney, Agent, or Firm* — Maschoff Brennan (57) ABSTRACT

A method of operating an image-sensing device includes detecting a trigger. The method also includes, in response to detecting the trigger, changing an operating mode of the image-sensing device from a first operating mode having a first spatial resolution and a first temporal resolution to a second operating mode having a second spatial resolution and a second temporal resolution. The second spatial resolution may be lower than the first spatial resolution and the second temporal resolution may be higher than the first temporal resolution. The method may also include capturing video data in the second operating mode, the video data having the second spatial resolution and the second temporal resolution.

20 Claims, 3 Drawing Sheets

(56) References Cited

OTHER PUBLICATIONS

"Photron" retrieved Oct. 22, 2013. <http://www.photron.com/>.
"What's My Heart Rate." retrieved Oct. 22, 2013. <https://play.google.com/store/apps/details?id=com.vitrox.facion.gui&hl=en>.
Durand, Fredo, William T. Freeman, John Guttag, Michael Rubinstein, Eugene Shih, and Hao-Yu Wu. "Eulerian Video Magnification for Revealing Subtle Changes in the World." ACM Transactions on Graphics. 31.4 (2012).

\* cited by examiner

REDUCTION OF SPATIAL RESOLUTION FOR TEMPORAL RESOLUTION

FIELD

The embodiments discussed herein are related to reducing spatial resolution of an imaging device for improved temporal resolution.

BACKGROUND

Digital video cameras record video as data in a memory and/or provide the data to a display on which the video may be viewed. Videos captured by digital video cameras include a sequence of frames captured at a given frame rate, or temporal resolution, and a given image resolution, or spatial resolution. Common temporal resolutions in relatively inexpensive digital video cameras include 24, 25, or 30 frames per second, and sometimes up to 60 frames per second in higher-end models. Spatial resolutions vary from device-to-device, but even relatively inexpensive digital video cameras have decent spatial resolutions.

Shutter speed refers to the amount of time that each frame is exposed for and is often expressed as a fraction of a second. By reducing the shutter speed, crisper, less blurry frames of video may be captured of moving or time-varying objects. For example, in some digital video cameras, the shutter speed may be changed from 1/60 of a second to 1/400 of a second to capture crisper frames. Changing the shutter speed, however, does not change the frame rate or the ability to resolve the timing of events between frames—what we refer to here as temporal resolution.

A high-speed camera is a digital camera often used to record fast-moving objects. Some high-speed cameras have temporal resolutions of 1,000 frames per second or even higher. Known high-speed cameras are also designed to capture images at reasonably high spatial resolution. As such they tend to be expensive and inappropriate for low-power handheld devices like smartphones.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of operating an image-sensing device includes detecting a trigger. The method also includes, in response to detecting the trigger, changing an operating mode of the image-sensing device from a first operating mode having a first spatial resolution and a first temporal resolution to a second operating mode having a second spatial resolution and a second temporal resolution. The second spatial resolution may be lower than the first spatial resolution and the second temporal resolution may be higher than the first temporal resolution. The method may also include capturing video data in the second operating mode, the video data having the second spatial resolution and the second temporal resolution.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

The embodiments discussed herein are related to reducing spatial resolution of an imaging device for improved temporal resolution.

Mobile phones, smartphones, tablet computers, laptop computers, and other mobile devices often include a relatively inexpensive cellphone camera, webcam or other image-sensing device. To reduce the cost of such mobile devices, the image-sensing devices are often implemented as relatively inexpensive charge-coupled devices (CCDs) or complementary metal-oxide-semiconductor (CMOS) sensors such as active-pixel sensors (APSs).

Some applications for mobile devices use the integrated image-sensing device to track heart rate or another biological parameter. For instance, the application may use the camera to sense and count peaks in a user's pulse and then average it over time. The application may use a sliding window of a minute, for instance. In these and other implementations, the temporal resolution may be relatively low as long as the occurrence of each peak may be detected, even if the exact timing of each peak relative to an immediately preceding peak is unknown. One illustrative example of a methodology for detecting heart rate information from a video is described in "Eulerian Video Magnification for Revealing Subtle Changes in the World," by Hao-Yu Wu et al., accessed on May 21, 2013 at http://people.csail.mit.edu/mrub/papers/vidmag-.pdf. The foregoing article is herein incorporated by reference in its entirety.

Although systems including applications and image-sensing devices with relatively low temporal resolution may be adequate for determining heart rate as an average over a window of time, the relatively low temporal resolution prevents such systems from being used to do more precise calculations based upon intervening peak-to-peak intervals such as heart rate variability (HRV) calculations or other calculations based on time-varying parameters that exhibit timing changes that are less than the per-frame timing of the low temporal resolution.

Additionally, many CCDs and other image-sensing devices have multiple different selectable spatial resolutions. These allow video to be captured at a desired spatial resolution, which may vary depending on the intended use and/or destination of the video. The temporal resolution is typically not adjusted, or is adjusted very little, for adjustments to the spatial resolution, as end users are typically used to watching video at around 24-30 frames per second and temporal resolutions outside that range may create noticeably different viewing experiences that may bother end users.

The frame rate in relatively inexpensive image-sensing devices such as CCDs is typically limited by the time it takes to move data off of the CCD into computer memory. As the spatial resolution increases, the time associated with flushing image data from the CCD also increases. Whereas video typically tops out at a temporal resolution of 30 frames per second, modern CCDs are typically fast enough to flush the memory between frames, even at full high definition (HD) spatial resolutions, so the end user perceives no compromise.

However, existing CCDs are typically inadequate for much higher temporal resolutions, such as 250 frames per second or higher. Temporal resolutions of 250 frames per second or higher are well beyond the range of existing relatively inexpensive image-sensing systems using their currently available spatial resolutions.

Embodiments described herein trade spatial resolution for temporal resolution. Trading spatial resolution for temporal resolution may be better understood as a tradeoff between temporal sampling versus video resolution and/or bandwidth. For instance, in the context of detecting heart rate information from a video of a human face, the average color of the forehead skin is sufficient, rather than the exact morphology of the face. For this information, a low spatial resolution video does not hinder analysis and may, in fact, be computationally preferable in some cases. However, the video's refresh rate may dictate the maximum detectable frequency component. Frequencies of at least 250 Hz may be the minimum for accurate analysis of HRV.

Accordingly, embodiments described herein may generally include significantly increasing the temporal resolution by making a concomitant decrease to the spatial resolution of an image-sensing device. For example, if the temporal resolution is increased by a factor of ten, e.g., from 30 frames per second to 300 frames per second, the spatial resolution may be decreased by a factor of ten or more.

By significantly increasing the temporal resolution, subtle changes in timing may be detected. Such subtle changes in timing may be detected to calculate HRV, for instance. HRV is one example where the relatively high spatial resolution that is common among modern digital video cameras is of much less value than relatively high temporal resolution which is not available in such digital video cameras.

Because many of the image-sensing devices used in such modern digital video cameras may already include hardware capable of trading temporal resolution for spatial resolution, some embodiments described herein may be implemented by a change at the firmware level of such image-sensing devices without requiring any hardware modifications.

Embodiments of the present invention will be explained with reference to the accompanying drawings.

Figure 1:
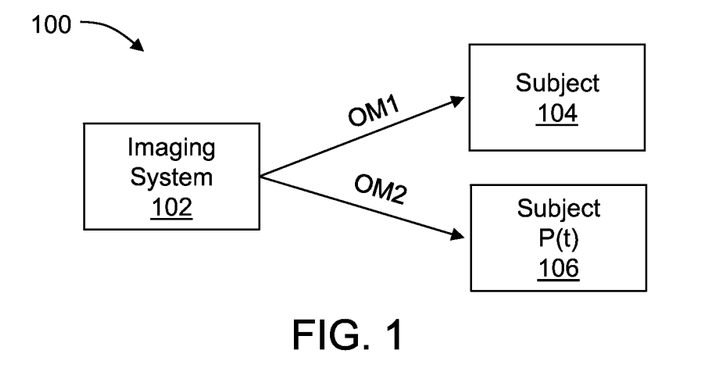
FIG. 1 is a block diagram of an example operating environment in which an imaging system may be implemented.

FIG. 1 is a block diagram of an example operating environment 100 in which an imaging system 102 may be implemented, arranged in accordance with at least one embodiment described herein. The imaging system 102 may be, for example, a mobile phone, a smartphone, a tablet computer, a laptop computer, a desktop computer, or other system including an image-sensing device such as a CCD or CMOS sensor. The operating environment 100 may additionally include one or more subjects 104, 106. The term "subject" is used generically herein to refer to any live or inanimate object for which video data may be captured.

The imaging system 102 may be configured to capture video data of the subject 104 while operating in a first operating mode, designated in FIG. 1 as "OM1." The first operating mode may have a relatively high spatial resolution, such as HD 720, and a relatively low temporal resolution, such as 30 frames per second, that are typical of consumer-level image-sensing devices. The first operating mode may generally be suitable for capturing video of subjects that exhibit non-subtle timing changes.

In these and other embodiments, each frame has a per-frame timing corresponding to the temporal resolution. The per-frame timing as used herein refers to the duration of time from one frame to the next. For instance, the per-frame timing is 1/30 of a second for a temporal resolution of 30 frames per second, while the per-frame timing is 1/60 of a second for a temporal resolution of 60 frames per second. Non-subtle timing changes may refer to changes in timing that are more than the per-frame timing of standard temporal resolutions such as 24-30 or even 60 frames per second. For example, changes or events that occur over periods exceeding 1/60 of a second or 1/30 of a second may be referred to as non-subtle timing changes. On the other hand, subtle timing changes may refer to changes in timing that are less than the per-frame timing of standard temporal resolutions. For example, changes or events that occur over periods less than 1/60 of a second may be referred to as subtle timing changes.

The subject 106 may exhibit subtle timing changes which the imaging system 102 may measure. For instance, the subject 106 may be a human and may have a time-varying parameter P(t) representing or reflecting heart rate of the subject 106, such as a color of the forehead of the subject 106 or other portion of the subject 106 which varies over time as a function of blood circulation of the subject 106. The beat-to-beat interval of heart rate as manifest by blood circulation and the corresponding change in color of the forehead of the subject 106 may exhibit subtle timing changes from one interval to the next.

Accordingly, the imaging system 102 may be configured to change from the first operating mode to a second operating mode, designated in FIG. 1 as "OM2," and to capture video data of the subject 106 while operating in the second operating mode. The imaging system 102 may thereby capture video data from which the subtle timing changes exhibited by the parameter P(t) may be calculated.

Figure 2:
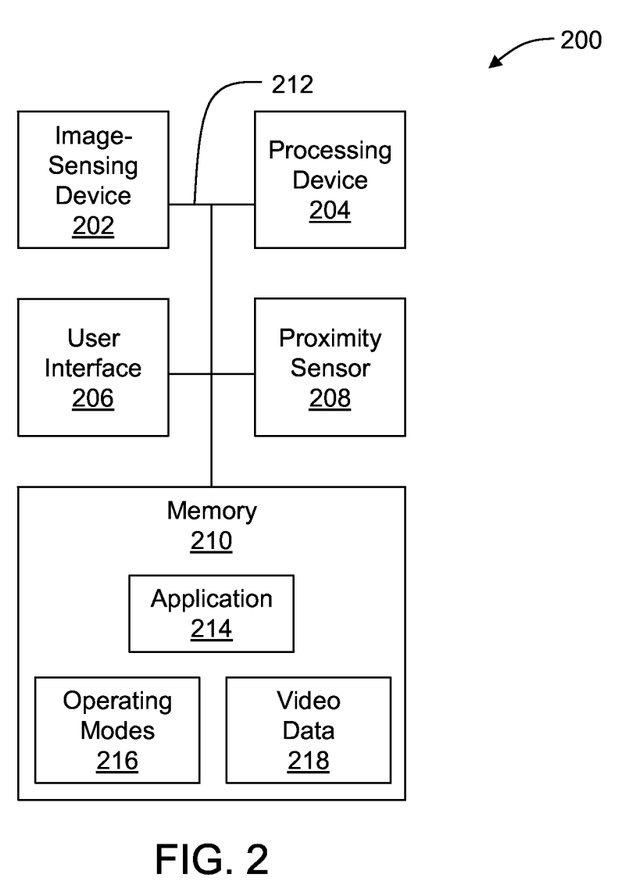
FIG. 2 is a block diagram of an example system of capturing video data.

FIG. 2 is a block diagram of an example system 200 of capturing video data, arranged in accordance with at least one embodiment described herein. The system 200 of FIG. 2 is an example embodiment of the imaging system 102 of FIG. 1. In some embodiments, the system 200 may be a mobile phone, a smartphone, a tablet computer, a laptop computer, a desktop computer, or other system including an image-sensing device with multiple operating modes having different combinations of spatial resolution and temporal resolution. Alternately, the system 200 may be implemented as a dedicated device.

As illustrated, the system 200 includes an image-sensing device 202 and a processing device 204. Optionally, the system 200 may further include a user interface 206, a proximity sensor 208, a memory 210, and/or a communication bus 212.

The image-sensing device 202 may include multiple operating modes. For example, at a minimum, the image-sensing device 202 may include a first operating mode with a corresponding spatial and temporal resolution, and a second operating mode with a corresponding spatial and temporal resolution. The spatial resolution of the second operating mode may be lower than the spatial resolution of the first operating mode, while the temporal resolution of the second operating mode may be higher than the temporal resolution of the first operating mode. For example, the temporal resolution of the second operating mode may be 10 or more times higher than the temporal resolution of the first operating mode. Accordingly, the image-sensing device 202 may include a CCD, an APS, or other image-sensing device with hardware capable of multiple operating modes.

The processing device 204 may be configured to execute computer instructions that cause the system 200 to perform the functions and operations described herein, such as detecting a trigger and changing the operating mode of the image-sensing device, among potentially others. The foregoing describes an example of a software implementation. Alternately or additionally, one or more of the functions and operations described herein may be implemented in hardware and/or firmware. The processing device 204 may include, but is not limited to, a processor, a microprocessor (μP), a controller, a microcontroller (μC), a central processing unit (CPU), a digital signal processor (DSP), any combination thereof, or other suitable processor.

The user interface 206 may be configured to receive a command from a user that is effective to change the operating mode of the image-sensing device 202. The command may be the trigger detected by the processing device 204. In these and other embodiments, the system 200 may further include an input device such as a keyboard, a mouse, a camera, a touch input device, or the like, that is configured to receive input from users. In some embodiments, the input interface 206 may include one or more peripheral interfaces, such as a serial interface controller and/or a parallel interface controller, which may be configured to communicate with external devices such as input devices (e.g., keyboard, mouse, camera, pen, voice input device, touch input device, etc.) or other peripheral devices (e.g., printer, scanner, etc.).

The proximity sensor 208 may be configured to detect proximity of objects relative to the image-sensing device 202 and to generate a signal representing the detected proximity. A signal generated by the proximity sensor 208 indicating an object is within a predetermined proximity of the image-sensing device may be the trigger detected by the processing device 204.

The memory 210 may generally include a non-transitory computer-readable medium, such as random access memory (RAM) or other suitable volatile storage. Alternately or additionally, the memory 210 may include nonvolatile storage. Computer instructions may be loaded into the memory 210 for execution by the processing device 204 to cause the processing device to perform one or more of the operations described herein.

Alternately or additionally, the memory 210 may include one or more applications 214 that use a particular operating mode of the image-sensing device 202. For example, an application for calculating HRV, stress, or some other biological marker based on a time-varying parameter exhibiting subtle timing changes may use video data captured in the second operating mode with relatively higher temporal resolution and lower spatial resolution, whereas a standard camera application or other applications may default to capturing video data in the first operating mode with relatively high spatial resolution and lower temporal resolution.

In some embodiments, the application 214 in use may automatically generate an output that is effective to select the second operating mode. Alternately or additionally, the application 214 may allow a user to select within the application 214 between any one of the multiple operating modes of the image-sensing device 202 and to thereby generate an output that is effective to select the second operating mode. The output of the application 214 may be the trigger detected by the processing device 204.

In some embodiments, the memory 210 may store operating modes of the image-sensing device 202 and/or settings or other data associated therewith as operating modes 216. Alternately or additionally, the memory 210 may store video data 218 captured by the image-sensing device 202. The video data 218 may have the first spatial and temporal resolutions when captured using the first operating mode, and/or the second spatial and temporal resolutions when captured using the second operating mode.

In some embodiments, the reduction in spatial resolution when changing from the first operating mode to the second operating mode may be accomplished by averaging big blocks of a frame having a same size when captured in the second operating mode as when captured in the first operating mode.

Alternately or additionally, the reduction in spatial resolution may be accomplished by taking only a subset of pixels of the image-sensing device. For instance, the application 214 may include a facial recognition algorithm or other algorithm that identifies those pixels representing the face of a user or other portion of a subject of interest and captures only those pixels. In these and other embodiments, the trigger may include a setting through the user interface 206 in combination with an output generated by an analysis of content of a frame of the video data. For example, if the correct setting has been set through the user interface 206 and the application 214 performs an analysis and determines that a face is in the field of view of the image-sensing device 202, the application 214 may output a signal or command or other output effective to reduce the spatial resolution by capturing only those pixels representing the face of the user and/or by averaging pixels across the face of the user, and to thereby increase the temporal resolution.

Accordingly, spatial resolution may be reduced in the second operating mode compared to the first operating mode by averaging pixels across an entire field of view of the image-sensing device 202 and/or by taking some subset of all available pixels of the image-sensing device 202.

The image-sensing device 202, the processing device 204, the user interface 206, the proximity sensor 208, and the memory 210 may be communicatively coupled via the communication bus 212. The communication bus 212 may include, but is not limited to, a memory bus, a storage interface bus, a bus/interface controller, an interface bus, or the like or any combination thereof.

Modifications, additions, or omissions may be made to the system 200 of FIG. 2 without departing from the scope of the present disclosure. For example, although the image-sensing device 202 has been described as explicitly having first and second operating modes, the image-sensing device 202 may more generally have two or more operating modes, such as three operating modes, four operating modes, and so on. Moreover, although the system 200 has been described as an integrated system such as a smartphone or other mobile device, the system 200 may instead be a distributed system in which one or more of the various components 202, 204, 206, 208, 210 are located remotely from the others and/or communication between at least some of the components 202, 204, 206, 208, 210 occurs over a hardwired or wireless connection rather than through the communication bus 212. Alternately, the system 200 may be a dedicated device.

Figure 3:
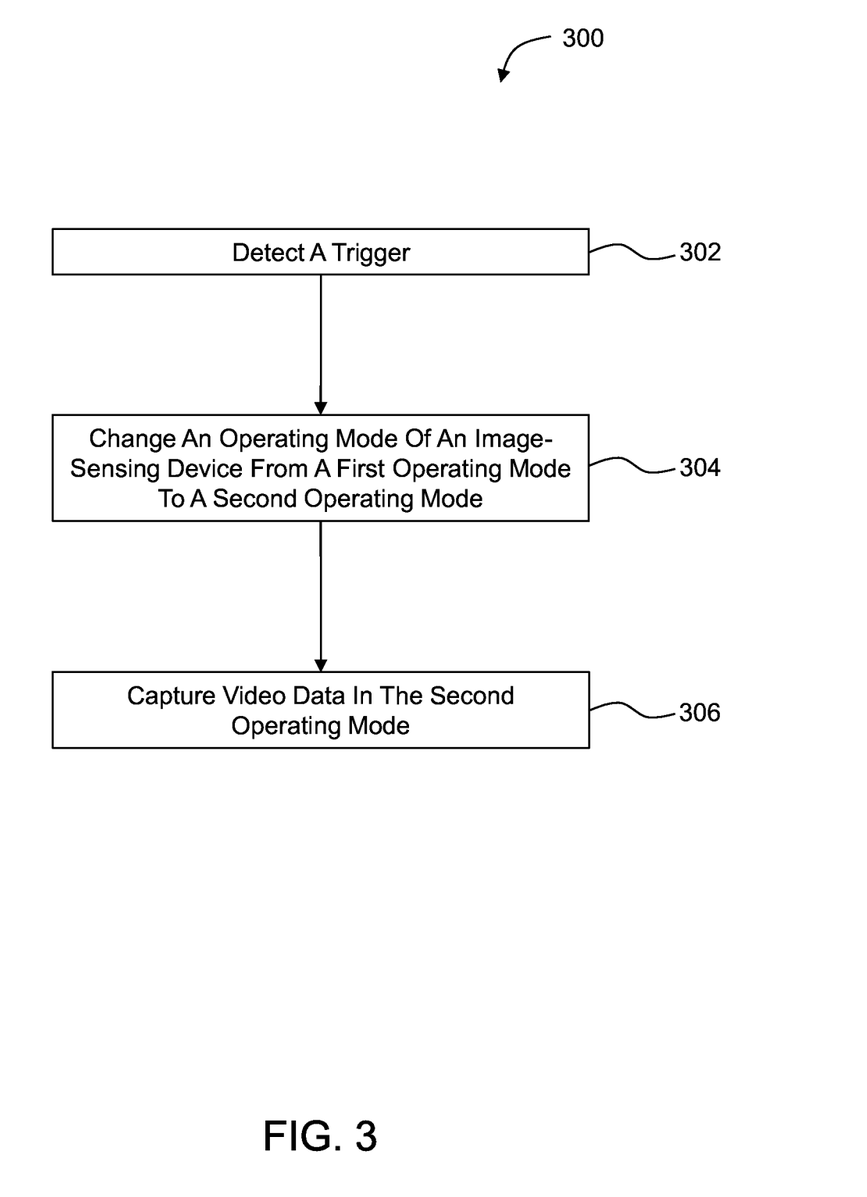
FIG. 3 shows an example flow diagram of a method of operating an image-sensing device.

FIG. 3 shows an example flow diagram of a method 300 of operating an image-sensing device, arranged in accordance with at least one embodiment described herein. The method 300 in some embodiments is performed by a system such as the imaging system 102 of FIG. 1 or the system 200 of FIG. 2. For instance, the processing device 204 of FIG. 2 may be configured to execute computer instructions stored on the memory 210 to perform functions and operations for operating an image-sensing device as represented by one or more of the blocks of the method 300 of FIG. 3. Although illustrated as discrete blocks, various blocks may be divided into additional blocks, combined into fewer blocks, or eliminated, depending on the desired implementation.

The method 300 may begin at block 302 in which a trigger is detected. The trigger may include a command input by a user through a user interface. Alternately or additionally, the trigger may include a signal generated by a proximity sensor, the signal indicating an object is within a predetermined proximity of the image-sensing device. Alternately or additionally, the trigger may include an output of an application that uses video data captured in an operating mode with relatively high temporal resolution, such as the second operating mode described above. Alternately or additionally, the trigger may include a setting through a user interface in combination with an output generated by an analysis of content of a frame of the video data as described above. Alternately or additionally, the trigger may include a combination of triggers.

In block 304, and in response to detecting the trigger, an operating mode of the image-sensing device may be changed from a first operating mode to a second operating mode. The first operating mode may have a first spatial resolution and a first temporal resolution. The second operating mode may have a second spatial resolution and a second temporal resolution. The second spatial resolution may be lower than the first spatial resolution while the second temporal resolution may be higher than the first temporal resolution.

The first temporal resolution may be less than or equal to 60 frames per second and the second temporal resolution may be greater than or equal to 250 frames per second. Alternately or additionally, the second temporal resolution may be greater than or equal to 500 frames per second.

In block 306, video data is captured in the second operating mode. The video data may have the second spatial resolution and the second temporal resolution.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In these and other embodiments, the video data may include video data of a time-varying parameter that exhibits subtle timing changes, or timing changes less than a per-frame timing of the first temporal resolution. For example, the time-varying parameter may represent or be reflective of a heart rate of a subject.

Accordingly, the method 300 may further include determining, from the video data with the second spatial resolution and the second temporal resolution, heart rate variability (HRV) of the subject. For example, the time-varying parameter may include a color of a forehead, a finger, or other portion of a subject where the color of the portion of the subject varies over time as a function of blood circulation of the subject. Although the change in color as a function of blood circulation may be slight or even unnoticeable to the naked eye, the "Eulerian Video Magnification for Revealing Subtle Changes in the World" already incorporated herein by reference discloses techniques for amplifying and/or detecting the color changes, which techniques or other techniques may be leveraged according to the embodiments described herein to detect peaks in color variation which reflect peaks in the subject's heart rate. Because the video data has the relatively high second temporal resolution, the timing between peaks may be accurately measured such that HRV and/or other biological markers may be accurately calculated.

Some embodiments described herein include a non-transitory computer-readable medium having computer instructions stored thereon that are executable by a processing device to perform one or more of the operations included in the method 300 of FIG. 3, such as the operations illustrated by blocks 302, 304, and/or 306 in FIG. 3, and/or variations thereof. The non-transitory computer-readable medium may include the memory 210 of FIG. 2, for example. The processing device may include the processing device 204 of FIG. 2, for example.

Figure 4:
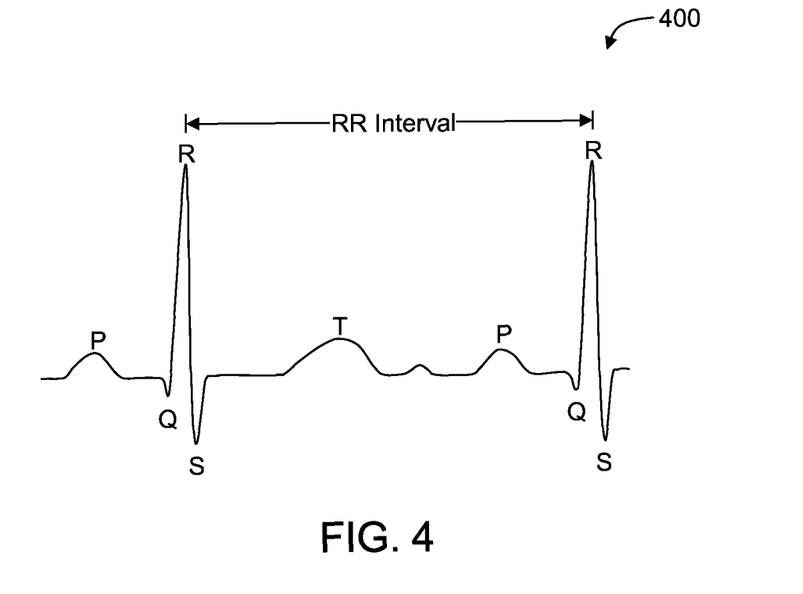
FIG. 4 is a graph including an example trace representing a normal heart rhythm.

FIG. 4 is a graph including an example trace 400 representing a normal heart rhythm, arranged in accordance with at least some embodiments described herein. A cardiac sensor such as an electrocardiograph (ECG) device may be configured to generate a data signal represented by such a trace by detecting electrical signals generated by the sinoatrial (SA) node of the heart, which electrical signals control the heart's rhythm.

The trace 400 includes various waves or portions labeled P, Q, R, S and T, some of which are sometimes grouped together and described as a complex, such as the QRS complex. In a normal heart rhythm, the SA node generates an electrical impulse which travels through the right and left atria. The P wave represents the electricity flowing through the atria. The QRS complex represents the flow through the ventricles as they contract to push the blood out from the heart. The T wave represents repolarization or the electrical resetting of the heart for the next beat. The next heart beat cycle begins at the next P wave.

As shown in FIG. 4, the RR interval is the time between successive R waves. Each RR interval corresponds to a heartbeat. Moreover, heart rate in terms of beats per minute is inversely proportional to the RR interval and may be calculated from the RR interval. Insofar as the length of each RR interval may vary from one heartbeat to the next, an instantaneous heart rate may be calculated for a single RR interval or an average heart rate may be calculated across multiple consecutive RR intervals. The variability of the RR interval from one heartbeat to the next is referred to as HRV.

The pumping of the heart circulates blood with the timing between one peak in circulation to the next peak corresponding to the timing of the corresponding RR interval. Because the blood circulation manifests as color changes in the skin of a subject, the peaks in color variations may be detected according to embodiments described herein using an image-sensing device having an operating mode with relatively low spatial resolution and high temporal resolution.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of operating an image-sensing device, the method comprising:
   detecting a trigger;
   in response to detecting the trigger, changing an operating mode of the image-sensing device from a first operating mode having a first spatial resolution and a first temporal resolution to a second operating mode having a second spatial resolution and a second temporal resolution, wherein the second spatial resolution is lower than the first spatial resolution and the second temporal resolution is higher than the first temporal resolution; and
   capturing video data in the second operating mode, the video data having the second spatial resolution and the second temporal resolution,
   wherein the first temporal resolution is less than or equal to 60 frames per second and the second temporal resolution is greater than or equal to 250 frames per second.

2. The method of claim 1, wherein the trigger comprises a command input by a user through a user interface.

3. The method of claim 1, wherein the trigger comprises a signal generated by a proximity sensor, the signal indicating an object is within a predetermined proximity of the image-sensing device.

4. The method of claim 1, wherein the trigger comprises an output of an application that uses video data captured in the second operating mode.

5. The method of claim 1, wherein the trigger comprises a setting through a user interface in combination with an output generated by an analysis of content of a frame of the video data.

6. The method of claim 1, wherein the second temporal resolution is greater than or equal to 500 frames per second.

7. The method of claim 1, wherein the video data comprises video data of a time-varying parameter that exhibits timing changes less than a per-frame timing of the first temporal resolution.

8. The method of claim 7, wherein the time-varying parameter represents or is reflective of a heart rate of a subject.

9. The method of claim 8, further comprising determining, from the video data with the second spatial resolution and the second temporal resolution, heart rate variability (HRV) of the subject.

10. The method of claim 8, wherein the time-varying parameter comprises a color of a portion of the subject, the color of the portion of the subject varying over time as a function of blood circulation of the subject.

11. A non-transitory computer-readable medium having computer instructions stored thereon that are executable by a processing device to perform operations comprising:
   detecting a trigger;
   in response to detecting the trigger, changing an operating mode of an image-sensing device from a first operating mode having a first spatial resolution and a first temporal resolution to a second operating mode having a second spatial resolution and a second temporal resolution, wherein the second spatial resolution is lower than the first spatial resolution and the second temporal resolution is higher than the first temporal resolution; and
   capturing video data in the second operating mode, the video data having the second spatial resolution and the second temporal resolution,
   wherein the first temporal resolution is less than or equal to 60 frames per second and the second temporal resolution is greater than or equal to 250 frames per second.

12. The non-transitory computer-readable medium of claim 11, wherein the trigger comprises one or more of:
   a command input by a user through a user interface;
   a signal generated by a proximity sensor, the signal indicating an object is within a predetermined proximity of the image-sensing device;
   an output of an application that uses video data captured in the second operating mode; or
   a setting through a user interface in combination with an output generated by an analysis of content of a frame of the video data.

13. The non-transitory computer-readable medium of claim 11, wherein:
   the video data comprises video data of a time-varying parameter that exhibits timing changes less than a per-frame timing of the first temporal resolution; and
   the time-varying parameter comprises a color of a portion of a subject, the color of the portion of the subject varying over time as a function of blood circulation of the subject.

14. The non-transitory computer-readable medium of claim 13, wherein the operations further comprise determining, from the video data with the second spatial resolution and the second temporal resolution, heart rate variability (HRV) of the subject.

15. A system comprising:
an image-sensing device with a first operating mode and a second operating mode, the first operating mode having a first spatial resolution and a first temporal resolution, the second operating mode having a second spatial resolution and a second temporal resolution, wherein the second spatial resolution is lower than the first spatial resolution and the second temporal resolution is higher than the first temporal resolution; and
a processing device configured to detect a trigger and in response to detecting the trigger, further configured to change an operating mode of the image-sensing device from the first operating mode to the second operating mode,
wherein the first temporal resolution is less than or equal to 60 frames per second and the second temporal resolution is greater than or equal to 250 frames per second.

16. The system of claim 15, further comprising a non-transitory computer-readable medium having computer instructions stored thereon that are executable by the processing device to perform operations including detecting the trigger and changing the operating mode, wherein the non-transitory computer-readable medium is further configured to store thereon video data captured by the image-sensing device, the video data having the second spatial resolution and the second temporal resolution.

17. The system of claim 15, further comprising a proximity sensor configured to detect proximity of objects relative to the image-sensing device and to generate a signal representing the proximity, wherein the processing device detecting a trigger includes the processing device detecting a signal from the proximity sensor indicating an object is within a predetermined proximity of the image-sensing device.

18. The system of claim 15, wherein the system is a dedicated device or a smartphone including the image-sensing device and the processing device.

19. The system of claim 15, wherein the image-sensing device comprises a charge-coupled device (CCD) or an active-pixel sensor (APS).

20. The system of claim 15, wherein the second temporal resolution is greater than or equal to 500 frames per second.

* * * * *